(12) United States Patent
Synnelius

(10) Patent No.: US 6,260,902 B1
(45) Date of Patent: Jul. 17, 2001

(54) GRIPPER WITH SEGMENTED ARMS

(76) Inventor: Sune Synnelius, Bangatan 41A, S-722 28 Västerås (SE)

( * ) Notice: Subject to any disclaimer, the term of this patent is extended or adjusted under 35 U.S.C. 154(b) by 0 days.

(21) Appl. No.: 09/665,703

(22) Filed: Sep. 20, 2000

Related U.S. Application Data

(63) Continuation of application No. PCT/SE99/00418, filed on Mar. 17, 1999.

(30) Foreign Application Priority Data

Mar. 20, 1998 (SE) .................................................. 9800945

(51) Int. Cl.[7] ...................................................... B25J 15/08
(52) U.S. Cl. ........................... 294/106; 294/88; 294/902; 901/39
(58) Field of Search .................................. 294/67.31, 88, 294/106, 111, 119.3; 414/729, 739; 623/57, 63, 64; 901/36, 37, 39

(56) References Cited

U.S. PATENT DOCUMENTS

| | | |
|---|---|---|
| 2,875,913 | 3/1959 | Gohrke et al. . |
| 3,927,424 * | 12/1975 | Itoh .................................. 294/106 X |
| 4,367,891 | 1/1983 | Wauer et al. . |
| 4,401,407 * | 8/1983 | Breckenridge .................... 294/106 X |
| 4,834,443 * | 5/1989 | Crowder et al. ...................... 294/106 |
| 4,984,951 * | 1/1991 | Jameson ........................... 294/106 X |
| 5,108,140 * | 4/1992 | Bartholet ............................. 294/106 |

FOREIGN PATENT DOCUMENTS

| | | |
|---|---|---|
| 59-69288 | 4/1984 | (JP) . |
| 772846 | 10/1980 | (SU) . |
| 1271745 | 11/1986 | (SU) . |

* cited by examiner

*Primary Examiner*—Johnny D. Cherry
(74) *Attorney, Agent, or Firm*—Young & Thompson

(57) ABSTRACT

A segmented gripper is provided, having two arms (2;3) which are operated for closing and opening movement in an operational plane. The arms are flexible in the way of a finger; i.e. the geometry is variable to adapt to the external shape of the article to be gripped. This is accomplished by providing a structure for the arms, wherein an outer row of pivotally connected links (6) is interconnected with an inner row of pivotally connected links (7), the interconnecting elements (8) being pivotally attached to the link connecting points of each row of links. The lengths of the interconnecting elements are successively decreasing towards the free end of each arm, so that the arm displays a claw-like configuration. The arms are pivotally attached on a support, so that when an actuating force is applied tangentially to the outer row of links, the arms are operated for a closing motion. When the exterior of an article is engaged by any of the inner links, continued tangential force causes the inner row of links to bend about the corresponding link connection point, the outer links peripherally overrunning the inner links by rotation of the interconnecting elements about the attachment points (9,10,11).

12 Claims, 3 Drawing Sheets

GRIPPER WITH SEGMENTED ARMS

This appln is a cont of PCT/SE99/00418 filed Mar. 17, 1999.

TECHNICAL FIELD

The present invention relates to a gripper for gripping, holding and transferring articles of varying shapes. More specifically, the invention relates to a gripper having segmented and flexible arms for accommodating to the outer shape of the article to be gripped between the arms of the gripper.

A problem related to lifting and transferring operations is the varying size of articles to be handled by a specific gripper. This is often solved by exchanging the gripper tool of e.g. an industrial robot. Another problem is the limited ability of some soft, fragile articles, like for instance a bag of powder, to resist concentrated loads applied by a on-linked universal gripper tool. The present invention provides a solution to this problem, meeting the object of invention as stated below.

OBJECT OF INVENTION

The present invention has for its object to provide a segmented gripper with one or more flexible arms, having the ability to accommodate to the outer shape of an article, so as to be operable for handling articles of different form and shape. In the case of handling soft articles, like e.g. the bag of powder, the applied load will not be concentrated but distributed over the surface thereby limiting in comparison with a non-linked gripper the requirement for the article to resist concentrated loads.

This object is met in a gripper according to the invention.

SUMMARY OF THE INVENTION

The present invention provides a gripper having two arms that are operated for closing and opening movements in an operational plane, The arms arc flexible in the way of a finger; i.e. the geometry is variable to adapt to the external shape of the article to be gripped. This is accomplished by providing a structure for the arms, wherein an outer row of pivotally connected links is interconnected with an inner row of pivotally connected links, the interconnecting elements being pivotally attached to the link connecting points of each row of links. The length of the interconnecting elements is successively decreasing towards the free end of the arm, so that each arm displays a claw-like configuration. The arms are pivotally attached to a support plate, so that when an actuating force is applied tangentially to the outer row of links, the arms are operated for a closing motion. When the exterior of an article is engaged by any of the inner links, continued tangential force causes the inner row of links to bend about the corresponding link connection point, the outer links peripherally overrunning the inner links by rotation of the interconnecting elements about the attachment points.

BRIEF DESCRIPTION OF THE DRAWINGS

Below, a representative embodiment of the invention is described more in detail with reference to the attached drawings, of which FIG. 1 discloses a gripper of the invention, in a diagrammatic, perspective view.

GENERAL DESCRIPTION OF PREFERRED EMBODIMENTS

Figure 1:
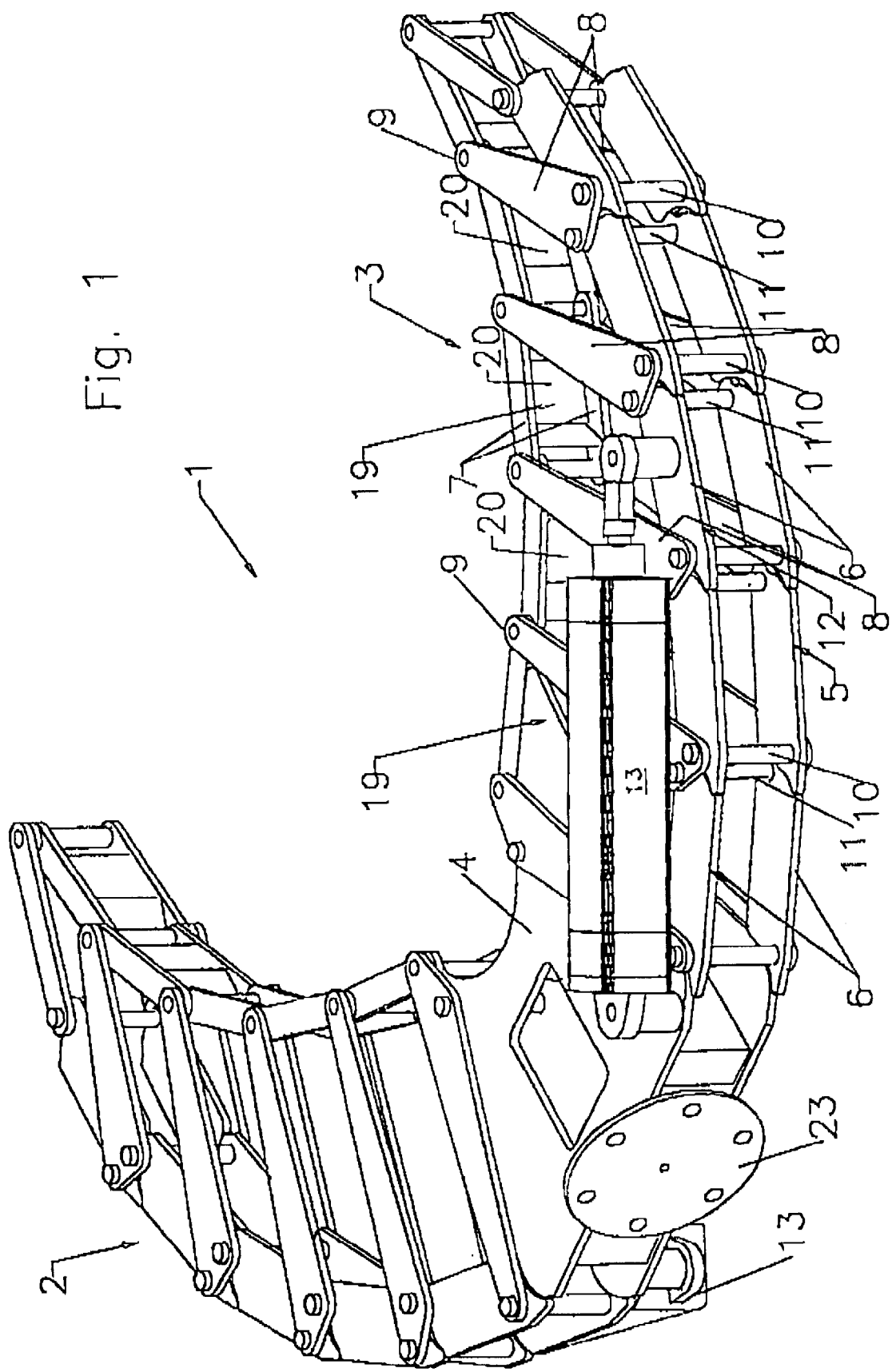

In FIG. 1, the invention is generally referred to as a gripper 1. The gripper 1 comprises two opposing gripper arms 2,3, the inner ends of which are pivotally journalled in a central support plate 4. Actuating means, such as a pair of cylinder units 13 are disposed to act between the support plate 4 and each one of the gripper arms 2,3. The actuating means are operative to impart a reciprocating movement in an operative plane of the gripper arms 2,3 for gripping and transferring an article, e.g. between working stations in a production line. As used herein, the expression reciprocating movement refers to the closing and opening motions of the arms 2,3. The actuating means 13 are controllable for securing the arms in a closed position around the article, for transferring operation. The actuating means 13 may be controlled for simultaneous and coordinated operation of the arms 2,3, and may optionally be controlled for individual operation of the arms, In this aspect, the cylinder units 13 may be conventionally equipped with a lock function on the piston rods, which may be an advantageous feature in the case where the gripped article is revolved so that load is mainly absorbed by one of the arms.

The two gripper arms are identical in construction, and in the following, reference is being made solely to the gripper arm 3 on the right hand side of the drawings of FIGS. 1 and 2. The gripper arm 3 comprises a set of segments 5, each segment being defined by an outer link 6, an inner link 7 and interconnecting spacing elements 8, forming the interconnecting sides of adjacently disposed segments 5. The inner links 7 of any two adjacent segments 5 are pivotally journalled on a common axis 9 in one end of the spacing element 8, and the outer links 6 of said two segments arc pivotally journalled on separate axes 10 and 11 in the other end of the spacing element 8.

Figure 2:
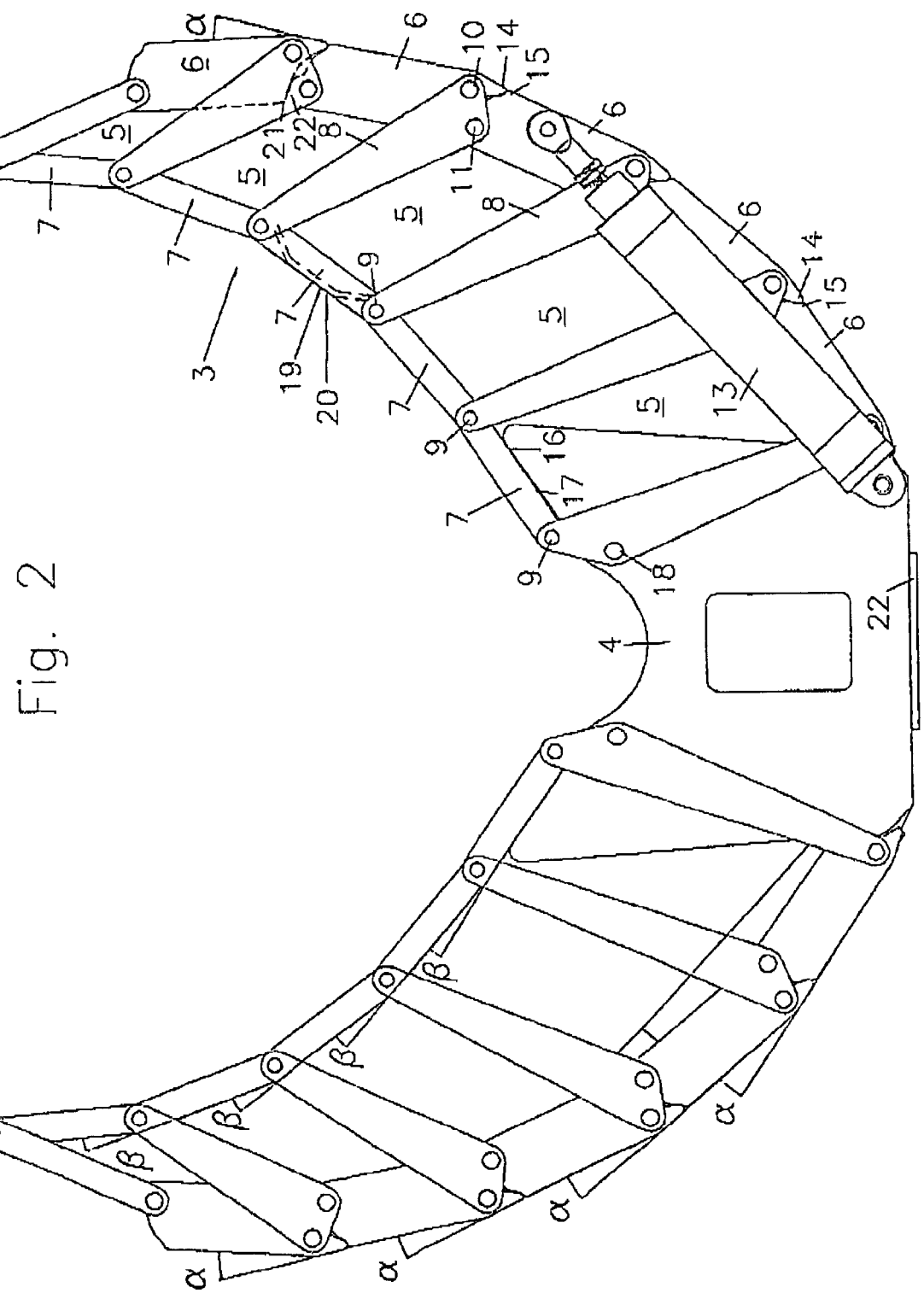
FIG. 2 shows the gripper of FIG. 1 in an elevation view from above.

Reference being made to FIG. 2, the abutting ends of the outer links 6 arc formed with first restriction means 14 and 15 for delimiting in one direction the reciprocating movement of the gripper arm 3. To this purpose, the outer links 6 may be formed with a heel 14 in its one end, co-acting with a seat 15 formed in the other end of an adjacently disposed outer link 6 for providing a positive stop in a contact position between heel 14 and seat 15 in an end position of the opening movement of the arm 3.

Optionally, a second restriction means 16 may be provided on the support plate 4. To this purpose, the support plate 4 is formed to have a knee 16, extending into all inner, first segment 5 of the gripper arm 3. The knee 16 is formed with a forward edge 17, providing a positive stop in the opening direction of the reciprocating movement of the gripper arm 3, by engaging the inner link 7 of said inner, first segment 5.

The restriction means 14,15 and 16 provide stability and rigidity of the gripper arm 3 in its maximum opened position. Design parameters for the restriction means 14,15 and 16 may preferably, as in the illustrated embodiment of FIG. 2, be chosen to secure that the outer link 6 is able to pivot about the axis 10, so that an angle alpha is greater than 0. In the resting or opening end position of gripper arm 3, the rows of connected outer links 6 and connected inner links 7 thereby display a bow shaped configuration, defined by the angle alpha.

In an advantageous and presently preferred embodiment as illustrated in FIGS. 1 and 2, a second set of segments 5 is disposed in parallel alignment to the first set of segments. The spacing of the two sets of segments is dimensioned through the length or height of the axes 9, 10 and 11, so that the two sets of segments have a box-like configuration. An engagement member 19 is formed on the inner links 7, respectively, in order to project a contact surface 20 to the article to be gripped by the arm 3. In the preferred embodiment, engagement member 19 connects the inner links 7 of two superimposed segments 5. Engagement members 19 may be bow-shaped in the closing direction of the arm 3, or may be angularly formed with one or more planar contact surfaces 20 as in the preferred embodiment, Optionally, the contact surface 20 may have any suitable form and operation adapted to a specific application, and may e.g. comprise friction means such as teeth or a serration, etc.

MODE OF OPERATION

In closing and gripping motion, the cylinder 13 is operated to expand and thereby rotate the arm 3 about an axis 18, by which the arm 3 is pivotally journalled in the support plate 4. When one engagement member 19 or inner link 7 engages the article to be gripped, the closing movement of the corresponding segment and of previous segments in the row of segments 5 is stopped. Continued operation of the cylinder 13 provides a tangential displacement of the row of outer links 6, that will cause all spacing elements 8 to rotate about the corresponding axis 9, thereby bending the arm 3 in the way of a finger about that axis 9 which is connecting the engaged inner link 7 and adjacent inner link 7 of the successive segment in the row of segments 5. Still continued operation of the cylinder 13 will cause the arm 3 to bend further around the article in the manner described, until the last or outmost inner link 7 is in engagement with the article to be gripped.

In opening motion, cylinder 13 is operated to retract and thereby successively disconnect the engagement members 19 or inner links 7 from engagement with the article, beginning with the inner link 7 of the outmost segment 5.

In the reciprocating motion of closing and opening the arm 3, the geometry of the segments 5 varies in response to the engagement and disengagement, respectively, with the gripped article. In the closing motion, the continued expansion of cylinder 13 causes the outer links 6 to overrun peripherally the inner links 7 in a bow shaped path, changing the relative angularity within the segments 5 individually in relation to the successive engagement with the article's exterior shape.

The length of the spacing elements 8 is successively decreasing towards the outer, free end of the arm 3. The rows of outer and inner links 6 and 7 thereby have substantially a semicircular shape, the centers of which are offset so that the center of the inner link circle is disposed in front of the outer link circle, as viewed in a direction towards the operational area of the gripper 1.

The spacing elements 8 are substantially triangular in shape, pivotally journalled in one inner end to the axis 9, connecting pivotally two inner links 7. The second, outer end of the spacing elements 8 that forms the base of the triangle, is pivotally journalled to successively coupled outer links 6, through the axes 10 and 11. The axes 10 and 11 are disposed in the triangle corners of spacing element 8, so that axis 10 is placed peripherally outside of the axis 11, thereby providing added momentum force in the end of the opening movement for securing a resting position with the restriction means 14 and 15 in active engagement.

To add constructive rigidity to the arm 3, the outer links 6 are formed with sliding faces 21 and 22 in the abutting ends of the outer links 6. The sliding faces 21 and 22 may be bow shaped to allow for sliding engagement between adjacent outer links 6 in the relative displacement during operation of the gripper 1. Elements 21 and 22 are designed to present additional restriction means for preventing an unlimited opening movement of the gripper arm, by having a radius that causes an interception between contacting surfaces 21 and 22 in the opening end position.

Figure 3:
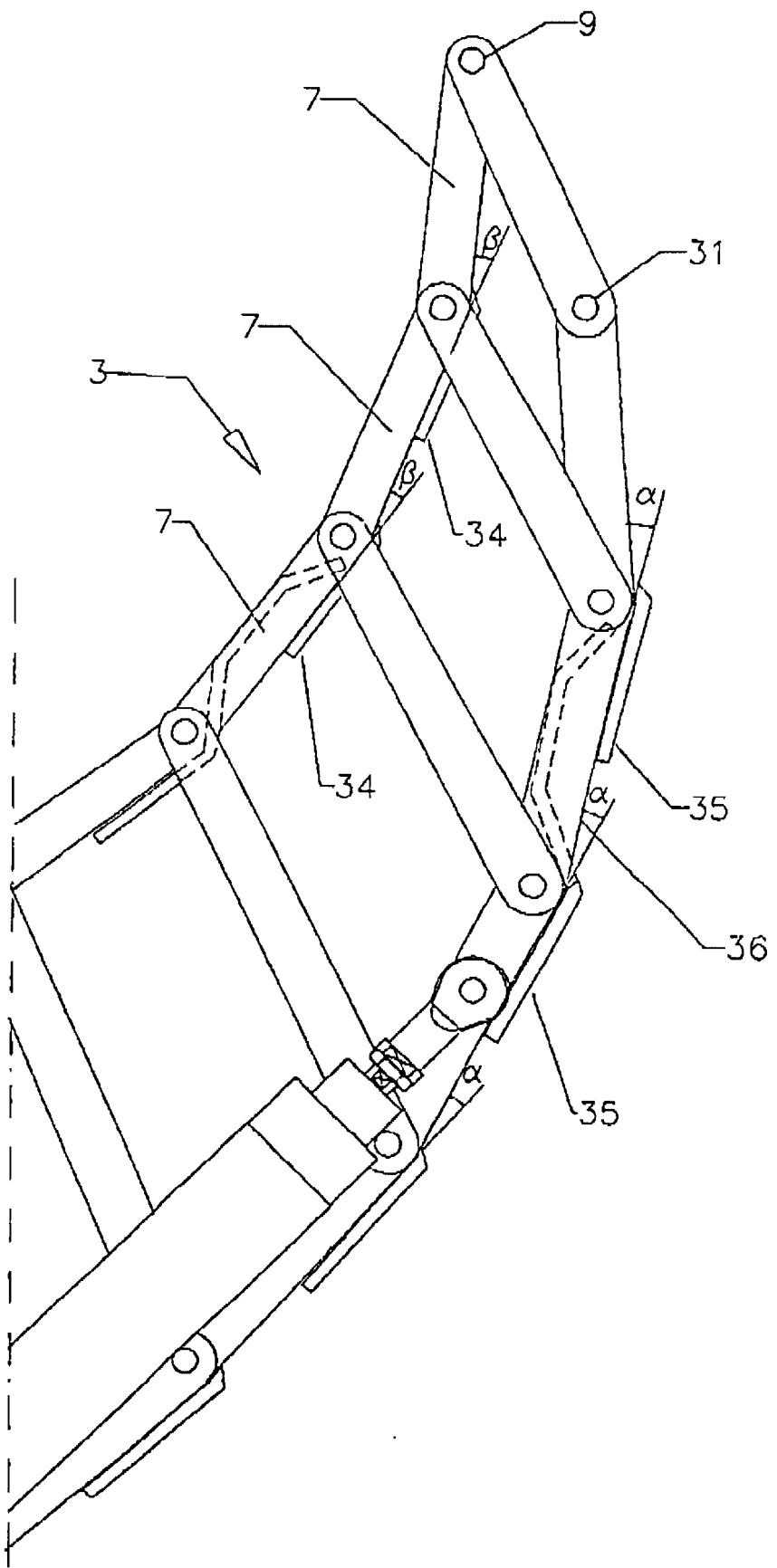
FIG. 3 shows an alternative embodiment of the inventive gripper.

In the drawing of FIG. 3, an angle b (beta) is introduced to define the relative angular positions of the inner links 7 in the opening end position. The angles a and b are related in effect of the geometry of the gripper arm, preferably both to be greater than 0, so that the gripper arm 3 in resting position displays a bow shaped configuration.

In the course of development, other embodiments have been contemplated for the inventive gripper, e.g., a gripper, having three or more arms in parallel to the operational plane (drawing plane of FIG. 2), or a gripper having one or several segmented and linked gripper arms, and one or several fixed or rigid arms or counter-acting supports or surfaces. Likewise, embodiments wherein the angles a and b may adopt the value 0, the gripper arm thereby displaying a straight line configuration in a resting position, or a negative value whereby the gripper arm is bent outwardly in the resting position, have been contemplated.

The restriction means, dimensioning the angles a and b and limiting the opening movement of the gripper arm 3, may be alternatively constructed as shown in FIG. 3. The engagement member 19 is here formed to have an extension 34, constituting a restriction 34 and providing a positive stop in the opening direction of the reciprocating movement of the gripper arm 3 by engaging the inner link 7 of the adjacently disposed segment 5. In a similar manner, the outer link 6 may be provided with an extension 35 constituting a restriction 35, operating similarly to the restriction 34 to provide a positive stop when contacting the outer link 6 of the adjacently disposed segment 5. The restriction means 34 and 35 may be separately applied or applied in combination, with or without one or both of the above said restriction means 14/15 and 21/22.

The embodiment of FIG. 3 further differs from the embodiment of FIGS. 1 and 2, in that the connecting point between inter-connecting spacing elements 8 and outer links 6 is a single axis 31 due to the alternatively formed restriction means 34 and 35.

The inventive gripper is contemplated for many useful and industrial applications.

E.g., the flexible gripper can be attached to the arm of an industrial robot included in a production line for transferring work pieces between work stations for machining, welding, mounting, surface treatment such as polishing, painting etc., but also for packaging, weighing and storing, etc.

Other contemplated applications may be the use of the flexible gripper on transport trucks, lifting cranes and other building construction vehicles, or for e.g. in agriculture and forest industry vehicles.

The inventive gripper has also been contemplated for use in artificial hands and limbs.

The support plate 4 is advantageously equipped with mounting means 23 for pivotally mounting the gripper 1 to a carrier. In this way, the gripper 1 is able to grip, lift and transfer the article while turning it a full 360 degrees so as to be operable in all spatial planes.

Thus there is provided a gripper for holding, lifting and transferring articles, with substantial flexibility to adopt to the outer shape of an article. The gripper arms 2,3 are structured with an outer row of pivotally connected links, the row of outer links being interconnected with an inner row of pivotally connected links, wherein the interconnecting elements arc pivotally attached to the link connecting points of each row of links. The arms are pivotally attached to an intermediate common support, so that when an actuating force is applied tangentially to the outer row of links, the arms are operated for a closing motion. When the exterior of an article is engaged by any of the inner links, continued tangential force causes the inner row of links to bend about the corresponding link connection point, the outer links peripherally overrunning the inner links by rotation of the interconnecting elements about the attachment points.

What is claimed is:

1. A gripper for gripping, holding and transferring articles, having arms (2;3) with an inner end thereof pivotally supported on a common support (4) and an outer, free end movable for closing and opening movements, each said arm (2;3) comprising:

an outer row of pivotally connected links (6) and an inner row of pivotally connected links (7);

spacing elements (8) pivotally attached to link connecting points (9,10,11; 9,31) of each said row of links (6;7) for interconnecting said outer and inner rows of links (6;7);

actuating means (13) operable to apply a tangential force to said outer row of links (6), as well as restrictions (14,15; 34,35) designed to define an end position of the opening movement of the gripper arm (2;3) at at least one angle (alpha) between connected outer links (6) and an angle (beta) between connected inner links (7), wherein the relative length of the spacing elements (8) being successively reduced in a direction towards the outer, free end of the gripper arm (2;3).

2. Gripper of claim 1, wherein said actuating means (13) are operative between said support (4) and each gripper arm (2;3), respectively, said actuating means being controllable to operate the gripper arms for coordinated reciprocating.

3. Gripper of claim 2, wherein said actuating means (13) is separately controllable for individual movements of each gripper arm.

4. Gripper of claim 1, wherein the inner links (7) are formed with surfaces for contact (20) with an article to be gripped.

5. Gripper of claim 1, further comprising restriction means (16) formed on said support (4), the restriction means (16) co-operating with one of said inner links (7) and defining an end position of the opening movement of the gripper arm (2;3).

6. Gripper of claim 1, wherein said support (4) comprises mounting means (23) for attaching the gripper pivotally on a carrier device, such that the gripper is operative for gripping, holding and transferring operations in any desired spatial plane.

7. Gripper of claim 1 arranged to be mounted on an industrial robot.

8. Gripper of claim 1 arranged for operation in an industrial process line.

9. Gripper of claim 1 arranged to be mounted for operation on a transport truck.

10. Gripper of claim 1 arranged to be mounted for operation in a lifting arrangement.

11. Gripper of claim 1 mounted for operation in an artificial limb.

12. Gripper of claim 1 having at least one moveable arm (3) co-operating with a support or supporting surface for holding an article.

* * * * *